(12) United States Patent
Plantan

(10) Patent No.: US 6,902,043 B2
(45) Date of Patent: Jun. 7, 2005

(54) DRIVELINE VEHICLE PARKING BRAKE ACTUATOR

(75) Inventor: Ronald S. Plantan, Charlotte, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 10/319,735

(22) Filed: Dec. 13, 2002

(65) Prior Publication Data

US 2004/0112692 A1 Jun. 17, 2004

(51) Int. Cl.$^7$ .............................................. F16D 65/24
(52) U.S. Cl. ........................................ 188/170; 92/63
(58) Field of Search .............................. 92/130 D, 62, 92/63; 188/170; 303/71

(56) References Cited

U.S. PATENT DOCUMENTS

| | | |
|---|---|---|
| 1,605,747 A | 11/1926 | Magness |
| 2,311,842 A | 2/1943 | Larson |
| 2,368,517 A | 1/1945 | Brimble |
| 2,937,622 A | 5/1960 | Brimhall |
| 2,990,813 A | 7/1961 | Barrett |
| 2,992,630 A | 7/1961 | Leighton et al. |
| 3,011,832 A | 12/1961 | Euga |
| 3,028,842 A | 4/1962 | Dobrikin et al. |
| 3,065,997 A | 11/1962 | Frankhouser et al. |
| 3,095,067 A | 6/1963 | Murty et al. |
| 3,101,133 A | 8/1963 | House et al. |
| 3,127,818 A | 4/1964 | Cruse |
| 3,158,069 A | 11/1964 | Edwards et al. |
| 3,176,870 A | 4/1965 | Cruse |
| 3,324,771 A | 6/1967 | Cruse |
| 3,508,469 A | 4/1970 | Williams |
| 3,659,501 A | 5/1972 | Beard ............................. 92/49 |
| 3,729,070 A | 4/1973 | Le Marchand .............. 188/170 |
| 3,799,297 A | 3/1974 | Ryburn et al. .............. 188/170 |
| 3,895,695 A | 7/1975 | Hunter ........................ 188/170 |
| 3,941,219 A | 3/1976 | Myers ......................... 188/170 |
| 3,977,304 A | 8/1976 | Meissner ........................ 92/30 |
| 3,994,205 A | 11/1976 | Ekdahl et al. .................. 92/29 |
| 3,994,206 A | 11/1976 | Dahlkvist et al. ............... 92/29 |
| 4,014,414 A | 3/1977 | Yamamoto et al. ......... 188/170 |
| 4,036,111 A | 7/1977 | Kahlkvist et al. ............... 92/29 |
| 4,138,001 A | 2/1979 | Lee et al. .................... 188/170 |
| 4,192,405 A | 3/1980 | Lee et al. .................... 188/170 |
| 4,234,062 A | 11/1980 | Kerscher et al. ............. 188/170 |
| 4,478,319 A | 10/1984 | Casalone et al. ........... 188/170 |
| 4,544,047 A | 10/1985 | Clemmons et al. ......... 188/170 |
| 4,550,811 A | 11/1985 | Rumsey ...................... 188/170 |
| 4,638,894 A | 1/1987 | Sitabkhan et al. .......... 188/170 |
| 4,649,804 A | 3/1987 | Oberlander .................... 92/63 |
| 4,723,636 A | 2/1988 | Lallier ......................... 188/170 |
| 4,793,449 A | * 12/1988 | Smith ......................... 188/107 |
| 5,002,164 A | 3/1991 | Bowyer ...................... 188/170 |
| 5,033,592 A | 7/1991 | Metzelfeld .................. 188/170 |
| 5,099,965 A | 3/1992 | Lehnert et al. ............. 188/170 |

(Continued)

Primary Examiner—Robert A. Siconolfi
(74) Attorney, Agent, or Firm—Howard & Howard

(57) ABSTRACT

A driveline vehicle parking brake actuator including a reciprocable piston, a spring guide having a tubular distal portion telescopically received on the piston and a radial proximal portion which is telescopically supported within the housing by an annular wear guide, and nested cylindrical coil springs including an outer cylindrical coil spring biased between the housing and the radial portion of the spring guide and a nested inner coil spring having a greater spring rate biased between the spring guide and the piston functioning in series. The distal end of the piston is attached to a cable and the springs are compressed by hydraulic or pneumatic pressure acting against the piston.

20 Claims, 3 Drawing Sheets

U.S. PATENT DOCUMENTS

| | | | |
|---|---|---|---|
| 5,353,688 A | 10/1994 | Pierce et al. | 92/63 |
| 5,377,579 A | 1/1995 | Pierce | 92/63 |
| 5,407,033 A | 4/1995 | Weiler et al. | 188/72.6 |
| 5,725,076 A | 3/1998 | Pierce et al. | 188/170 |
| 5,816,371 A | 10/1998 | Buckley et al. | 188/170 |
| 5,836,233 A | 11/1998 | Rumsey | 92/63 |
| 5,904,228 A | 5/1999 | Eike et al. | 188/170 |
| 5,937,974 A | 8/1999 | Cathcart et al. | 188/203 |
| 6,050,372 A | 4/2000 | Fisher | 188/170 |
| 6,145,635 A | 11/2000 | White | 188/170 |
| 6,253,886 B1 | 7/2001 | Brugait et al. | 188/170 |
| 6,378,668 B1 * | 4/2002 | Zemyan et al. | 188/170 |
| 6,412,612 B1 | 7/2002 | Parsons | 188/170 |
| 6,431,329 B1 * | 8/2002 | Huber et al. | 188/33 |
| 6,435,321 B1 | 8/2002 | Asano | 188/170 |

* cited by examiner

DRIVELINE VEHICLE PARKING BRAKE ACTUATOR

FIELD OF THE INVENTION

This invention relates to driveline vehicle parking brake actuators, particularly including cable-type driveline vehicle parking brake actuators, wherein the brake actuator includes a reciprocable piston having a cable at its distal end and the piston is movable to tension the cable and actuate the vehicle parking brake.

BACKGROUND OF THE INVENTION

Heavy-duty trucks, buses and other large vehicles are equipped with pneumatic or hydraulic brake actuating systems. The brake actuating system applies pneumatic or hydraulic fluid under pressure to a service chamber of a brake actuator to move a diaphragm or piston to actuate the brake system.

The brake actuator system further includes a parking brake actuator including one or more coil springs which actuates the brake when the fluid pressure is released, serving as a parking brake, and which will actuate the braking system in the event that the pneumatic or hydraulic system of the vehicle fails, serving as an emergency braking system preventing a runaway vehicle. The brake actuating system of this invention is particularly directed to vehicle parking brake actuators.

There are several types of parking brake actuators, including piston-type parking brake actuators and diaphragm-type parking brake actuators. In the diaphragm-type parking brake actuators, the power spring is maintained in a compressed state by pneumatic pressure acting against a flexible diaphragm. In piston-type parking brake actuators, the piston includes a head portion which sealingly engages an internal surface of the brake actuator housing and pneumatic or hydraulic pressure acting against the piston head maintains the power spring in a compressed state. The present invention is particularly, but not exclusively, adapted for piston-type parking brake actuators including hydraulic brake actuators. Driveline parking brake actuators generally include a cable connected to the distal end of the piston of the brake actuator, wherein movement of the piston by the power spring tensions the cable and actuates the vehicle parking brake.

There are several problems associated with the design of a driveline parking brake actuator. First, the spring rate or force provided by the spring should be substantially constant over the stroke of the piston. Second, the spring rate must be within the parameters required for the application, typically 55 to 65 lbs/in. Third, side loads should not be transferred to the piston to avoid wear or binding of the brake actuator which may reduce the life of the brake actuator or cause failure. Finally, the length verses diameter ratio must be within defined parameters to avoid buckling. It is also desirable to reduce the size and volume of the driveline parking brake actuator to increase its application. Further, it would be desirable to provide a "soft" or low spring rate which is constant over the stroke of the piston having the required spring rate. These objects are achieved with the driveline vehicle parking brake actuator of this invention as set forth below.

SUMMARY OF THE INVENTION

The driveline vehicle parking brake actuator of this invention includes a housing defining an enclosed chamber, a reciprocable piston within the chamber movable to actuate the vehicle parking brake. In a preferred embodiment of a driveline vehicle piston-type parking brake actuator of this invention, the piston includes a proximal end having an enlarged head portion engaging an internal surface of the chamber in sealed relation and a distal end receiving a cable as described above. The parking brake actuator further includes a source of fluid under pressure within the housing normally biasing the piston in a distal direction. In one preferred embodiment, the source of fluid pressure is hydraulic fluid or liquid as described further below. The assembly further includes a spring guide having a first distal tubular end telescopically received on the piston, a first radial portion, a second tubular portion surrounding the piston in spaced relation and a second radial proximal portion. The proximal end of the spring guide is telescopically guided within the housing by a self-lubricating annular wear guide which, in combination with the tubular distal end typically received on the piston, prevents lateral loads on the pistons and cable from being transferred and assures fluid motion of the piston. As used herein, the term "distal" refers to a component or a portion of a component which is nearest the cable and the term "proximal" refers to a component or a portion of a component which is closest to the port of the chamber which receives fluid under pressure or furthest from the cable and is used herein for descriptive purposes only.

The driveline vehicle parking brake actuator of this invention further includes a first coil spring surrounding the second tubular portion of the spring guide compressed between a distal end of the housing and the second radial portion of the spring guide and a second coil spring within the second tubular portion of the spring guide surrounding the piston and compressed between the distal end or first radial portion of the spring guide and the piston or piston head. The first and second coil springs therefore function in series, urging the piston in the proximal direction and drive the piston to tension the cable and actuate the vehicle parking brake when the fluid pressure is released or when the pneumatic or hydraulic pressure of the vehicle falls below a predetermined minimum pressure serving as an emergency brake.

In a preferred embodiment, the second coil spring is shorter than the first coil spring and has a greater spring rate than the first coil spring and the coil springs are cylindrical. The second coil spring is nested within the first coil spring providing a constant spring rate within the stroke of the piston and a "soft" or low spring rate within the required parameters for the driveline vehicle parking brake actuator, thereby achieving the objects of this invention including constant spring rate over the stroke of the piston within the parameters required for the application, side loads will not be transferred to the piston, reducing wear or binding of the brake actuator and the springs will not buckle. The driveline vehicle parking brake actuator of this invention is also compact with reduced length and diameter and the nested springs in series provide a "soft" or low spring rate.

In a preferred embodiment of the hydraulic driveline vehicle parking brake actuator of this invention, the assembly includes a tubular hydraulic piston which, in the disclosed embodiment, is integral with a hydraulic manifold and extends into the housing chamber coaxially aligned with the piston and the shaft portion of the piston is tubular including a hydraulic chamber which receives hydraulic liquid from the hydraulic piston of the manifold, such that the piston is normally extended distally when the hydraulic liquid chamber in the piston is pressurized. When the pressure is removed or reduced below a predetermined pressure, such as upon actuation of the parking brake, the coil springs expand, driving the piston proximally, thereby tensioning the cable and actuating the parking brake.

Other advantages and meritorious features of the driveline vehicle parking brake actuator of this invention will be more fully understood from the following description of the preferred embodiments, the appended claims and the drawings, a brief description of which follows.

DESCRIPTION OF THE PREFERRED EMBODIMENTS

Figure 1:
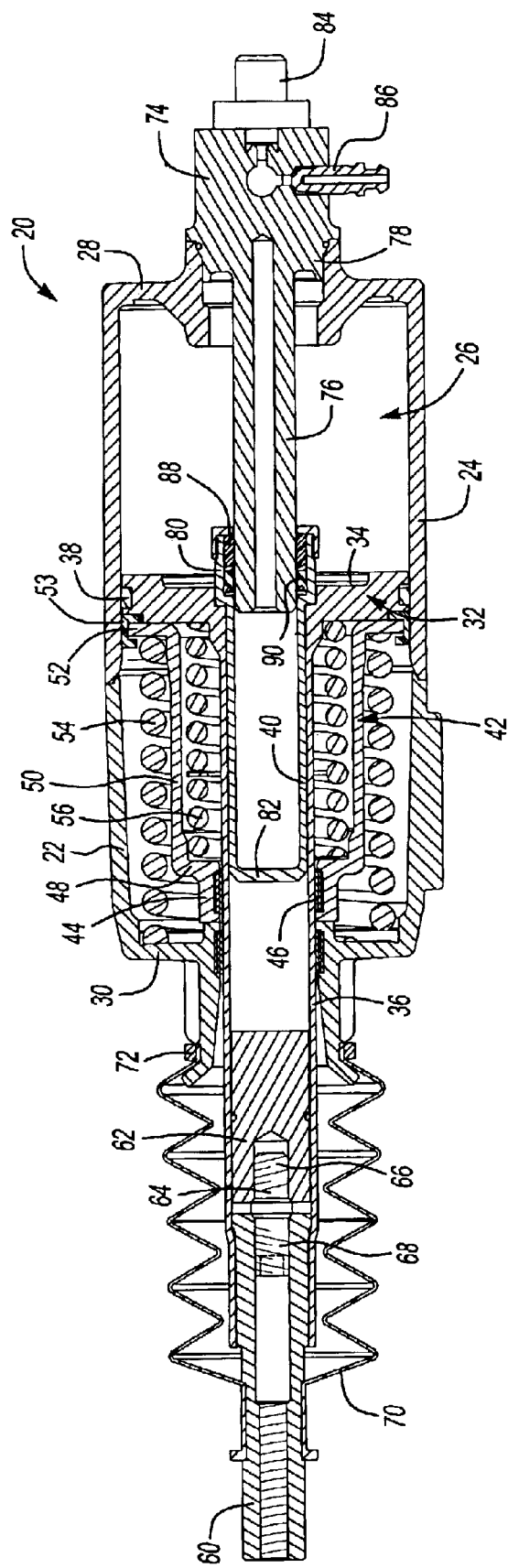
FIG. 1 is a side cross-sectional view of a hydraulic driveline vehicle parking brake actuator of this invention.
Figure 2:
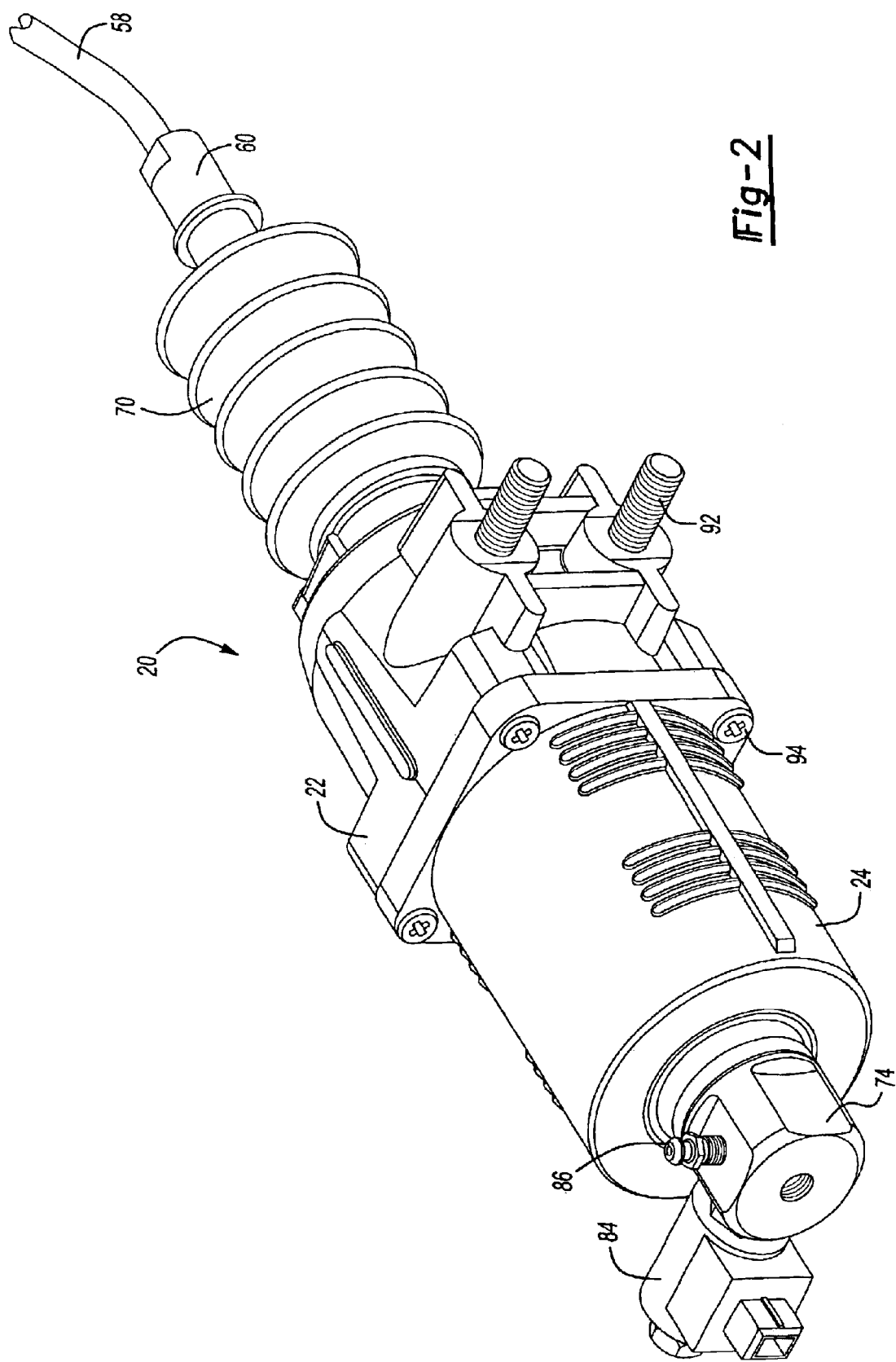
FIG. 2 is a side elevation of the embodiment of the driveline vehicle parking brake actuator shown in FIG. 1.

The first disclosed embodiment of the driveline vehicle parking brake actuator 20 disclosed herein and shown in FIGS. 1 and 2 is particularly adapted for a heavy-duty vehicle having a hydraulic brake system as described further below. The brake actuator 20 includes a housing which, in the disclosed embodiment, includes an aluminum case 22 and an aluminum head 24 defining an enclosed chamber 26. For purposes of this description as discussed above, the housing includes a proximal radial portion 28 and a radial distal portion 30. The brake actuator includes a reciprocable piston 32 including an enlarged cylindrical head portion 34 and a tubular shank portion 36. The piston head 34 in this embodiment includes a ring-shaped wear guide band 38 which guides the piston head 34 for reciprocal movement in the chamber 26 and reduces wear. In this embodiment, the piston 32 further includes a hydraulic cylinder 40 which is press fit in the tubular shank portion 36 as described below. The driveline vehicle parking brake actuator 20 of this invention further includes a spring guide 42 which includes a first distal tubular portion 44 telescopically received on the tubular shank portion 36 of the piston 32 having an inside diameter generally equal to the outside diameter of the tubular shank portion 36 for reciprocal motion relative to the piston. In the disclosed embodiment, a ring-shaped Nylon beating 46 is provided as shown. The spring guide 42 is fully guided by the piston 32 and cannot move laterally. The spring guide 42 further includes a first radial portion 48, a second tubular portion 50, having a diameter greater than the tubular shank portion 36 of the piston 34, and a second proximal radial portion 52.

As described, the driveline vehicle parking brake actuator 20 of this invention includes a unique dual nested spring assembly which provides a "soft" low spring rate which is constant within the stroke of the piston 32, fully guided within the housing. The spring assembly includes a first or outer cylindrical coil spring 54 which is compressed between the distal radial end 30 of the case 22 and the second proximal radial portion 52 of the spring guide 42. The spring assembly further includes a second cylindrical coil spring 56 which is compressed between the first radial portion 48 of the spring guide and the head 34 of the piston 32. The coil springs 54 and 56 are thus fully nested, reducing the overall length of the brake actuator 20 and function in series. That is, the first outer spring 54 is compressed between the radial portion 30 of the case and the spring guide 52 and the second coil spring 56 is compressed between the radial portion 48 of the spring guide and the piston 32. The proximal end 52 of the spring guide 42 is supported and telescopically guided within the housing (22 and 24) by an annular self-lubricating bearing or wear guide 53. In the disclosed embodiment, the annular wear guide 53 is C-shaped in cross-section and split received around the proximal radial portion 52 of the spring guide and formed of a self-lubricating polymer, such as a fluorocarbon polymer, but may be formed of various polymers. The wear guide 53 has an external diameter generally equal to an internal diameter of the housing and thus telescopically guides the spring guide 42 and prevents transmission of lateral loads on the assembly to the piston 32. Thus, the coil springs and the piston are fully guided for telescopic movement within the housing by the tubular distal end 44 of the spring guide, which is telescopically received on the piston 32, and the wear guide 53, which telescopically supports the proximal end 52 of the spring guide 42 within the housing.

As will be understood by those skilled in the art, the combined spring rate of the coil springs 54 and 56 functioning in series, is as follows:

$1/K_1 + 1/K_2 = 1/K_3$ wherein $K_3$ is the total spring rate and $K_1$, and $K_2$ are the spring rates of the coil springs 54 and 56. Thus, for example, if each of the coil springs 54 and 56 had the same spring rate, the total spring rate would be one-half of the spring rates of the individual coil springs. In the preferred embodiment, however, the first coil spring 54 is longer than the second coil spring 56 and the second coil spring 56 has a greater spring rate than the first coil spring 54. As set forth above, the combined spring rate of the coil springs 54 and 56 is determined by the application. In a driveline vehicle parking spring brake actuator for heavy vehicles of the type disclosed herein, the combined spring rate must generally be between 55 and 65 lbs/in. As an example only and not limiting the invention to any specific spring rates except as set forth in the claims, a suitable spring rate for the first coil spring 54 is 98 lbs/in and the spring rate for the second coil spring is 155 lbs/in, resulting in a combined spring rate of about 58 lbs/in. As set forth above, the combined spring rate is therefore within the required spring rate for this application. Thus, it would be theoretically possible to use one coil spring having a spring rate of 58 lbs/in; however, this would result in buckling. As will be understood by those skilled in this art, compression springs that have a length greater than four times the spring diameter can buckle.

The driveline vehicle parking brake actuator 20 of this invention is connected to the braking system of the vehicle (not shown) by a cable 58 shown in FIG. 2. The cable 58 is connected to a stem 60 connected to the distal end of the tubular shank portion 36 of the piston 32 as shown in FIG. 1. The stem 60 is connected to a metal target 62 by an adjuster screw 64 having opposed oppositely threaded ends 66 and 68 which are threadably received in the stem 60 and the target 62 as shown. Thus, upon movement of the piston 32 proximally or to the right in FIG. 1, the cable 58 is tensioned, actuating the parking brake of the vehicle. The disclosed embodiment includes a dust boot 70 which is retained to the housing by a clip ring 72.

The spring assembly is nominally maintained in the compressed state shown in FIG. 1 either by hydraulic or pneumatic pressure. In this embodiment, wherein the brake is actuated by hydraulic pressure, hydraulic liquid is received under pressure through the manifold 74 which includes a tubular hydraulic piston 76 coaxially aligned with the tubular shank portion 36 of the piston and the hydraulic cylinder 40. The manifold 74 includes a male threaded portion 78 which is threadably received in the proximal end 28 of the head 24 as shown in FIG. 1. The tubular hydraulic cylinder 40 includes an enlarged tubular entrance portion 80 which is press fit into the head 34 and receives the distal end of the tubular hydraulic piston 76. The tubular hydraulic cylinder 40 includes a closed end 82, such that hydraulic fluid under pressure received through the hydraulic piston 76, pressurizes the hydraulic cylinder 40, driving the piston head distally and compressing the coil springs 54 and 56 as shown in FIG. 1. The driveline brake actuator further includes a solenoid valve 84, best shown in FIG. 2, connected to the hydraulic system of the vehicle (not shown). The manifold 74 includes a conventional bleed valve 86 and the enlarged cylindrical portion 80 of the tubular hydraulic cylinder 40 includes a ring-shaped Nylon wear band 88 and a polymeric ring seal 90.

The operation of the driveline vehicle parking brake actuator 20 should now be understood from the above description of the components. Briefly, the driveline vehicle parking brake actuator 20 is pressurized by hydraulic fluid received through the manifold 74 into the tubular piston 76 which drives the piston 32 distally to compress the coil springs 54 and 56 as shown in FIG. 1. The parking brake of the vehicle is then actuated by releasing the hydraulic pressure by opening solenoid valve 84, releasing the pressure and the coil springs 54 and 56 then drive the piston proximally, tensioning the cable 58 and actuating the vehicle parking brake in a conventional manner. As will be understood by those skilled in this art, the driveline vehicle parking brake actuator is normally located beneath the vehicle in the frame assembly (not shown). As shown in FIG. 2, the case 22 includes mounting bolts 92 for mounting the brake actuator to a component of the lower vehicle frame assembly (not shown). The head 24 is secured to the case 22 by bolts or screws 94 which, in the disclosed embodiment, are tamper-resistant mounting bolts.

Figure 3:
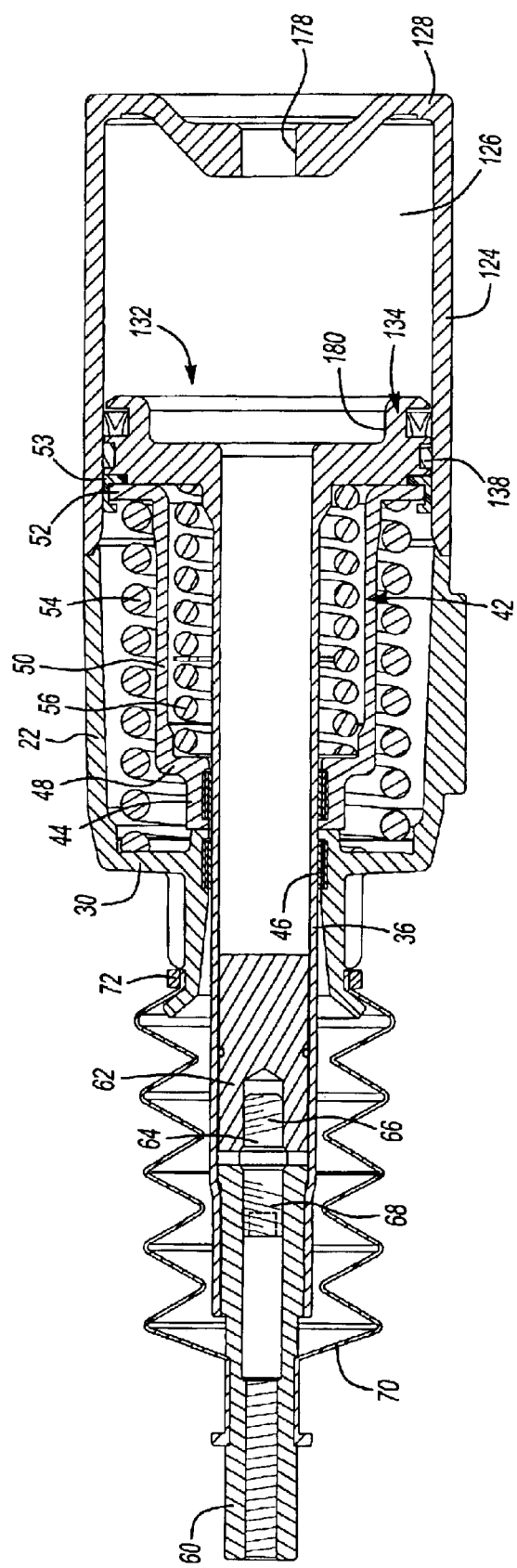
FIG. 3 is a side cross-sectional view of a pneumatic driveline vehicle parking brake actuator embodiment of this invention.

FIG. 3 illustrates an alternative embodiment of a driveline vehicle parking brake actuator 120 for a vehicle having a pneumatic braking system. Because the major components of the driveline vehicle parking brake actuator 120 may be identical to the components of the hydraulically activated driveline parking brake actuator 20 shown in FIGS. 1 and 2, such components are numbered the same as in FIGS. 1 and 2. In the pneumatic embodiment of the driveline parking brake actuator 120 shown in FIG. 3, the head 124 includes a distal end 128 having a threaded port 178 for receipt of a conventional pneumatic fitting (not shown) connected to the pneumatic system of the vehicle. The head portion 134 of the piston 132 has also been modified to include an enlarged inlet port 180 as shown in FIG. 3. The remaining components of the pneumatic driveline parking brake actuator 120, except for the elimination of the hydraulic cylinder 40, the manifold 74, including the hydraulic piston 76, may be identical to the driveline parking brake actuator 20 shown in FIGS. 1 and 2 and are therefore numbered the same as FIG. 1.

As will be understood from FIG. 3 and the description of the operation of the hydraulic driveline brake actuator 20 shown in FIGS. 1 and 2, the operation of the pneumatic driveline parking brake actuator 120 shown in FIG. 3 is substantially identical. That is, pneumatic pressure is received through port 178 into the pneumatic chamber 126, which drives the piston 132 distally or to the left in FIG. 3. When the pneumatic pressure is released, such as by opening a pneumatic solenoid valve (not shown), the coil springs 54 and 56 drive the piston 132 distally or to the right in FIG. 3, tensioning the cable 58 shown in FIG. 2, and actuating the parking brake of the vehicle as described above. However, the embodiments of the driveline vehicle parking brake actuators 20 and 120 will also serve as an emergency brake actuator when the hydraulic or pneumatic pressure falls below a predetermined minimum or the system fails, wherein the coil springs 54 and 56 expand, thereby tensioning the cable 58 and actuating the vehicle parking brake system.

As will be understood by those skilled in this art, various modifications may be made to the driveline vehicle parking brake actuators disclosed herein within the purview of the appended claims. Although the vehicle parking brake actuator of this invention was designed for a driveline parking brake application, the improvements disclosed herein may also be utilized for a more conventional brake actuator, wherein the piston serves as a push rod to rotate a brake linkage to actuate the parking brake. Having described preferred embodiments of the driveline vehicle parking brake actuator of this invention, the invention is now claimed as follows.

What is claimed is:

1. A driveline vehicle parking brake actuator, comprising:
   a housing defining an enclosed chamber adjacent a proximal end of said housing;
   a reciprocable piston within said chamber including a proximal end having a head portion engaging an internal surface of said chamber in sealed relation and a distal end receiving a cable;
   a source of fluid under pressure within said chamber normally biasing said piston in a first direction away from said proximal end of said housing;
   a spring guide within said chamber including a distal tubular portion surrounding and telescopically received in bearing relation on said piston and a proximal radial portion;
   a first coil spring surrounding said tubular portion of said spring guide compressed between said housing and said proximal radial portion of said spring guide; and
   a second coil spring having a greater spring rate than said first coil spring within said tubular portion of said spring guide surrounding said piston and compressed between said spring guide and said head portion of said piston;
   wherein said first and second coil springs function in series having a substantially constant spring rate within a stroke of said piston, urging said piston in a second direction toward said proximal end of said housing and tensioning said cable and actuate a vehicle parking brake.

2. The driveline vehicle parking brake actuator as defined in claim 1, wherein said first coil spring is longer than said second coil spring.

3. The driveline vehicle parking brake actuator as defined in claim 1, wherein said proximal radial portion of said spring guide is telescopically supported within said housing by an annular wear guide having an outer diameter generally equal to an inner diameter of said housing.

4. The driveline vehicle parking brake actuator as defined in claim 3, wherein said annular wear guide is C-shaped in cross-section, split and received around the proximal radial portion of the spring guide and formed of a self-lubricating wear resistant polymer.

5. The driveline vehicle parking brake actuator as defined in claim 1, wherein said fluid is hydraulic liquid.

6. The driveline vehicle parking brake actuator as defined in claim 5, wherein said brake actuator includes a tubular hydraulic piston adjacent a proximal end of said brake actuator coaxially aligned with said piston and a tubular hydraulic pressure chamber telescopically receiving said tubular hydraulic piston fixed to said piston.

7. The driveline vehicle parking brake actuator as defined in claim 1, wherein said coil springs are cylindrical and said second coil spring is nested within said first coil spring.

8. A driveline vehicle parking brake actuator, comprising:
   a housing defining an enclosed chamber having proximal and distal ends;
   a reciprocable piston within said chamber having a distal end receiving a cable and said piston movable in a proximal direction to tension said cable and actuate a vehicle parking brake;
   a source of fluid pressure within said chamber normally biasing said piston in a distal direction;
   a spring guide within said chamber including a first distal tubular portion telescopically received on said piston, a first radial portion, a second tubular portion spaced from said piston and a second proximal radial portion telescopically supported within said housing by an annular wear guide having an outer diameter generally equal to an internal diameter of said housing;
   a first cylindrical coil spring surrounding said second tubular portion of said spring guide compressed between said distal portion of said chamber and said second proximal radial portion of said spring guide;
   a second cylindrical coil spring having a greater spring rate than said first coil spring within said second tubular portion of said spring guide compressed between said first radial portion of said spring guide and said piston;
   wherein said first and second cylindrical coil springs function in series urging said piston in a proximal direction and driving said piston to tension said cable and actuate said vehicle parking brake when said fluid pressure falls below a predetermined minimum pressure.

9. The driveline vehicle parking brake actuator as defined in claim 8, wherein said first coil spring is longer than said second coil spring.

10. The driveline vehicle parking brake actuator as defined in claim 8, wherein said annular wear guide is split and formed of a self-lubricating wear resistant polymer.

11. The driveline vehicle parking brake actuator as defined in claim 8, wherein said source of fluid pressure is hydraulic liquid and said brake actuator includes a tubular hydraulic piston adjacent said proximal end of said chamber coaxially aligned with said piston and a tubular hydraulic pressure chamber telescopically receiving said tubular hydraulic piston and fixed relative to said piston.

12. The driveline vehicle parking brake actuator as defined in claim 8, wherein said second cylindrical coil spring within said second tubular portion of said spring guide is nested within said first coil spring.

13. The driveline vehicle parking brake actuator as defined in claim 8, wherein said source of fluid pressure is a gas and said piston includes a proximal head portion engaging an internal surface of said chamber in sealed relation and said proximal end of said chamber includes a pneumatic port receiving gas under pressure and urging said piston in said distal direction.

14. A hydraulic vehicle driveline parking brake actuator, comprising:
   a housing defining an enclosed chamber including proximal and distal ends;
   a brake actuating piston including an enlarged proximal head portion having a central opening, an outer periphery engaging an internal surface of said chamber in sealed relation and a distal tubular portion aligned with said central opening of said enlarged proximal head portion having, a hydraulic chamber therein including a closed distal end and a distal end receiving a cable, said piston movable in a proximal direction to tension said cable and actuate a vehicle parking brake;
   a hydraulic tubular piston fixed relative to said proximal end of said chamber receiving hydraulic liquid under pressure coaxially aligned with said hydraulic chamber in said distal tubular portion of said brake actuating piston telescopically receiving said hydraulic tubular piston, said hydraulic tubular piston directing hydraulic liquid into said hydraulic chamber biasing said brake actuating piston away from said proximal end of said housing and said brake actuating piston moveable toward said proximal end of said housing with said tubular hydraulic piston reciprocating in said hydraulic chamber;
   a spring guide within said chamber including a first distal tubular portion telescopically receiving said tubular portion of said brake actuating piston, a first radial portion, a second tubular portion spaced from said piston and a second proximal radial portion;
   a first coil spring surrounding said second tubular portion of said spring guide compressed between said distal end of said chamber and said second radial portion of said spring guide; and
   a second coil spring within said second tubular portion of said spring guide compressed between said first radial portion of said spring guide and said enlarged proximal head portion of said brake actuating piston;
   wherein said first and second coil springs function in series urging said brake actuating piston in a proximal direction and said hydraulic liquid received within said tubular hydraulic chamber urging said piston in a distal direction.

15. The hydraulic brake line vehicle brake actuator as defined in claim 14, wherein said second coil spring has a greater spring rate than said first coil spring.

16. The hydraulic brake line vehicle brake actuator as defined in claim 14, wherein said first coil spring is longer than said second coil spring.

17. The hydraulic brake line vehicle brake actuator as defined in claim 14, wherein said proximal radial portion of said spring guide is telescopically supported within said housing by an annular polymeric wear guide having an outer diameter generally equal to an inner diameter of said housing.

18. A pneumatic driveline vehicle parking brake actuator, comprising:
   a housing defining an enclosed chamber adjacent a proximal end of said housing;
   a reciprocable piston within said enclosed chamber including a proximal head portion having an open end and an outer periphery engaging an internal surface of said chamber in sealed relation, a distal tubular portion communicating with said open end of said head portion having a closed distal end receiving a cable;
   a source of pneumatic pressure within said enclosed chamber directing air under pressure into said open end of said head portion and into said distal tubular portion, thereby biasing said reciprocable piston in a first direction away from said proximal end of said housing;

a spring guide within said enclosed chamber including a distal tubular portion surrounding and telescopically supported on said tubular distal portion of said reciprocable piston and a proximal radial portion;

a first coil spring surrounding said tubular portion of said spring guide and said distal tubular portion of said reciprocable piston compressed between said housing and said proximal radial portion of said spring guide; and a second coil spring within said tubular portion of said spring guide surrounding said distal tubular portion of said reciprocable piston and compressed between said spring guide and said head portion of said reciprocable piston;

wherein said first and second coil springs function in series, urging said piston in a second direction toward said proximal end of said housing, thereby tensioning said cable to actuate a vehicle parking brake.

19. The pneumatic driveline vehicle parking brake actuator as defined in claim 18, wherein said second coil spring has a greater spring rate than said first coil spring and said first and second coil springs function in series having a substantially constant spring rate within a stroke of said piston.

20. The pneumatic driveline vehicle parking brake actuator as defined in claim 18, wherein said first coil spring is longer than said second coil spring.

* * * * *